United States Patent
Gong et al.

(10) Patent No.: US 9,220,054 B2
(45) Date of Patent: Dec. 22, 2015

(54) ENHANCED SERVICE DISCOVERY MECHANISM IN WIRELESS COMMUNICATION SYSTEM

(75) Inventors: Michelle Gong, Sunnyvale, CA (US); Guoqing Li, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 32 days.

(21) Appl. No.: 12/644,567

(22) Filed: Dec. 22, 2009

(65) Prior Publication Data

US 2011/0151840 A1 Jun. 23, 2011

(51) Int. Cl.
*H04W 48/12* (2009.01)
*H04W 80/02* (2009.01)
*H04W 84/12* (2009.01)
*H04L 29/08* (2006.01)
*G06Q 30/02* (2012.01)

(52) U.S. Cl.
CPC .......... *H04W 48/12* (2013.01); *G06Q 30/0267* (2013.01); *H04L 67/16* (2013.01); *H04W 80/02* (2013.01); *H04W 84/12* (2013.01)

(58) Field of Classification Search
CPC ... H04L 67/16; H04L 12/2809; H04L 12/281; H04L 12/2816; H04L 2012/2841
See application file for complete search history.

(56) References Cited

U.S. PATENT DOCUMENTS

| | | | |
|---|---|---|---|
| 7,333,464 B2 * | 2/2008 | Yang et al. | 370/338 |
| 7,379,958 B2 | 5/2008 | Karhu | |
| 7,403,512 B2 * | 7/2008 | Tsai et al. | 370/338 |
| 2004/0199616 A1 * | 10/2004 | Karhu | 709/221 |
| 2005/0021725 A1 | 1/2005 | Lobbert | |
| 2006/0034256 A1 | 2/2006 | Addagatla et al. | |
| 2008/0178248 A1 | 7/2008 | Kim | |
| 2008/0184307 A1 | 7/2008 | Kim et al. | |
| 2008/0184328 A1 | 7/2008 | Kim | |
| 2009/0175207 A1 * | 7/2009 | Stephenson et al. | 370/311 |
| 2009/0240794 A1 * | 9/2009 | Liu et al. | 709/223 |
| 2010/0100525 A1 * | 4/2010 | Huang | 707/609 |

FOREIGN PATENT DOCUMENTS

| | | |
|---|---|---|
| JP | 2009-070293 | 4/2009 |
| WO | 2008/000495 | 1/2008 |

OTHER PUBLICATIONS

RFC 2608: Service Location Protocol, Version 2, Published Jun. 1999 Authors: E. Guttman, C. Perkins, J. Veizades, M. Day.*

(Continued)

*Primary Examiner* — Nalini Mummalaneni
(74) *Attorney, Agent, or Firm* — Pillsbury Winthrop Shaw Pittman LLP

(57) ABSTRACT

According to various embodiments, an apparatus and method are disclosed that are configured to transmit from a controller to associated mobile stations an advertising message including an advertising information element indicative of the establishment of the new association of a new service provider capable of providing at least one particular service.

19 Claims, 4 Drawing Sheets

(56) References Cited

OTHER PUBLICATIONS

SLP-based Service Management for Dynamic Ad-hoc Networks; MPAC '05, Nov. 28-Dec. 2, 2005 Grenoble, France Author: Stefan Penz.*
International Search Report and Written Opinion mailed Aug. 31, 2011, for PCT/US2010/058240.
State Intellectual Property Office of the People's Republic of China, Office Action, Application No. 201010602398.8, mail date Mar. 26, 2013, total of 17 sheets.

E. Guttman et al., Service Location Protocol, Version 2, Network Working Group, Request for Status: 2608, Jun. 1999, total of 12 sheets.
State Intellectual Property Office (SIPO) of the People's Republic of China, Chinese Patent Application No. 201010602398.8, mail date Oct. 23, 2013, total of 9 pages.
Japanese Patent Office, Japanese Patent Application No. 2012-545979, mail date Sep. 10, 2013, total of 7 pages.
Japanese Office Action, Japanese Patent Application No. 2012-545979, mail date Mar. 11, 2014.

* cited by examiner

ENHANCED SERVICE DISCOVERY MECHANISM IN WIRELESS COMMUNICATION SYSTEM

BACKGROUND

This disclosure relates generally to the field of wireless communication, and in particular to discovering services provided by associated service providers using Layer 2 Service Discovery protocols.

A variety of devices are capable of providing services, for example, printing service, via wireless communication networks operating in compliance with standardized technologies such as IEEE 802.11. Conventionally, those devices and/or services are discovered using Layer 3 Service Discovery (L3SD) protocols, such as Simple Service Discovery Protocol (SSDP), wherein service consumers are required to establish a layer-3 end-to-end connection with service providers in order to obtain multicast messages describing services provided by those service providers. These L3SD protocols can result in a lengthy connection process to discover services.

Layer 2 Service Discovery (L2SD) enables devices to discover desired services without having to establish layer-3 connection. Efforts have been made to implement L2SD operable in some wireless communication standards, such as Wi-Fi Protected Setup (WPS), Peer 2 Peer Special Interest Group (P2P SIG) and Wireless Gigabit Alliance (WGA).

DETAILED DESCRIPTION

Definitions

Figure 1:
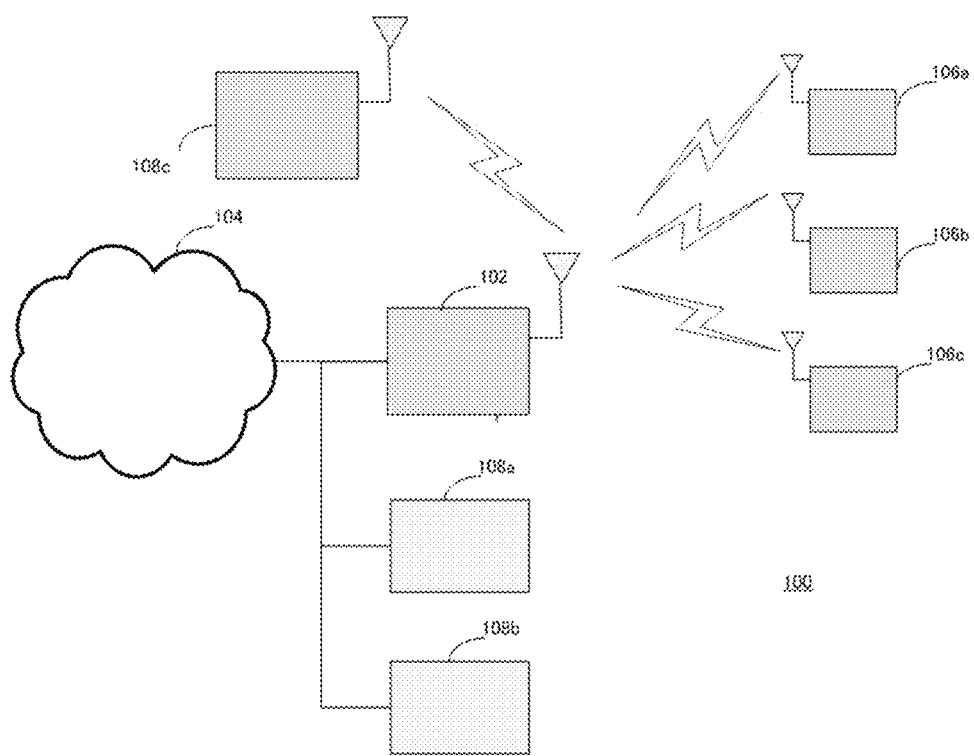
FIG. 1 illustrates an example network architecture in accordance with various aspects of the present disclosure.

"Service" can be used interchangeably with "device", or includes device.

Service provider: Any device capable of providing services such as printing via the wireless medium (WM) for STAs.

Access Point (AP): Any entity that has a station (STA) functionality and provides access to the distribution services, via the WM for associated STAs.

Mobile Station (MS): A type of STA that uses network communications while in motion.

Station (STA): Any device that contains an IEEE 802.11-conformant medium access control (MAC) and physical layer (PHY) interface to the wireless medium (WM).

Wireless medium (WM): The medium used to implement the transfer of protocol data units (PDUs) between peer physical layer (PHY) entities of a wireless local area network (LAN).

Layer 2 Service Discovery (L2SD) is a protocol which allows communication devices to discover network services provided by other devices at Layer 2 of the Open System Interconnection Reference Model (OSI Reference Model).

Layer 3 Service Discovery (L3SD) is a protocol which allows communication devices to discover network services provided by other devices at Layer 3 of the OSI Reference Model. An example of L3SD includes Universal Plug and Play (UPnP), Zero configuration networking (ZeroConf) and Simple Service Discovery Protocol (SSDP).

DESCRIPTION

Various embodiments disclosed herein relate to an apparatus and method that facilitate an efficient service discovery at Layer 2 in a wireless communication system where services are provided by one or more service providers to one or more mobile stations associated with a controller. The wireless communication system is operable according to standard protocols such as Wi-Fi Protected Setup (WPS), Peer 2 Peer Special Interest Group (P2P SIG) and Wireless Gigabit Alliance (WGA).

According to various embodiments, an apparatus and method of this disclosure may be used to transmit, from a controller to associated mobile stations, an advertising message including an advertising information element indicative of the establishment of the new association of a new service provider configured to provide at least one particular service. The advertising message may be configured as one of Layer-2 broadcasting messages such as a Beacon frame in the IEEE 802.11 standard. The advertising information element may be encoded in such a broadcasting message. The advertising information element may include less bits as compared to that of service information element that describes services provided by service providers. In some embodiment, the advertising information element may consist of singly binary bit.

At the receipt of the advertising information element, the mobile stations may transmit to the controller a discovery request for further information regarding the new service. In response to the discovery request, the controller may transmit the service information element associated with the particular service provided by the new service provider. Using the transmitted service information element, the requesting mobile station may establish an upper layer connection with the service provider. In this way, the service information element relating to the new service is transmitted only to the mobile station(s) transmitting the discovery request in response to the advertising information element. Because the advertising information element used in this disclosure consists of smaller number of binary bit(s) as compared to the service information element and the service information element is not transmitted to all the associated mobile stations, the disclosed service discovery mechanism can reduce the amount of data used to advertise a new service. This embodiment may be deemed as "pull model" since the service information element is provided in response to the discovery request from the requesting mobile station.

According to various embodiments, an apparatus and method may be used to transmit a service information element based on a desired service type registered with a controller. This operation may be deemed as "push model", where a service information element is transmitted to mobile stations without active solicitation from them. In this push model, the controller may receive from the associated mobile stations a discovery request for a service including desired service type and retain the desired service type at a memory device until a suitable service matching to the discovery request is active. If a new association is established between the controller and a new service provider configured to provide a particular service, the controller determines whether the particular service matches the retained discovery request; and, if any, transmit the matching service information element to the requesting mobile station.

FIG. 1 illustrates an example architecture of a system 100 in accordance with various aspects of the present disclosure. The system 100 may include a controller 102 configured to wirelessly communicate with associated mobile stations 106a, 106b, and 106c (hereinafter "mobile station 106" or "MS 106"). Controller 102 may be configured as an Access Point (AP) in the IEEE 802.11 standard or Private Coordinate Point (PCP) in Wireless Personal Area Network (WPAN) standards such as 60 GHz WPAN.

Controller 102 may also have wired connections with, for example, service providers 108a and 108b as well as wireless connections with, for example, a network 104 and a service provider 108c. These service providers 108a, 108b and 108c hereinafter may be collectively referred to as "service provider 108". Service provider 108 may be configured to be, for example, PC peripherals such as a printer, monitors and projectors. Service provider 108 provides the MS 106 with a various kinds of services such as a printing via the wireless media.

Figure 2:
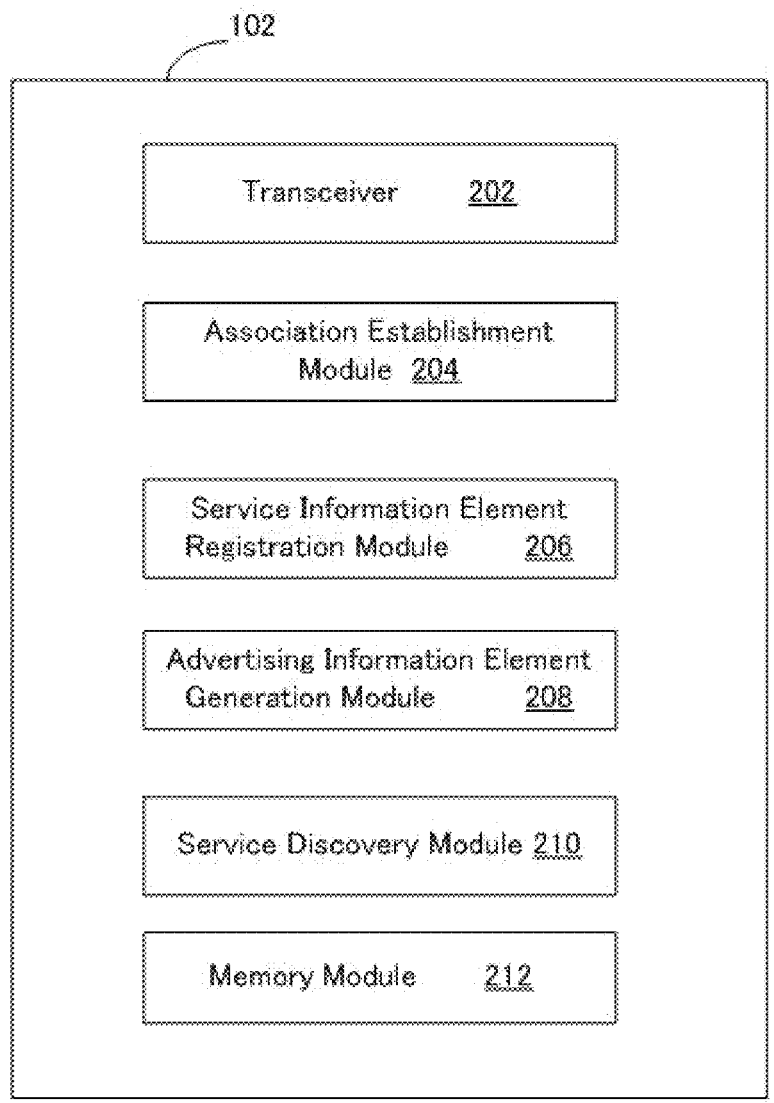
FIG. 2 illustrates a block diagram illustrating an example controller in accordance with various aspects of the present disclosure.

FIG. 2 is a block diagram illustrating an example controller 102 in accordance with various aspects of the present disclosure. Controller 102 may include, among others, a transceiver 202, an association establishment module 204, service information element (service IE) registration module 206, a advertising information element (advertising IE) generation module 208, a service discovery module 210, and a memory module 212. Transceiver 202 may transmit to and receive communications from MS 106 via the wireless medium. For example, transceiver 202 may receive a discovery request for a desired service from MS 106 and transmit to MS 106 various communications, including an advertising information element (advertising IE) and service information element (service IE). The advertising IE may be encoded in a Beacon. Transceiver 202 may also receive, from associated service provider 108, a service registration request including a service IE. The service IE may include a sub-element, for example, TLVs, in which the services offered by the requesting service provider 108 and various attributes corresponding to the service are encoded. For example, the attributes of the service IE includes the service type, context (location), and user friendly name. These attributes may be provided by higher level service applications associated with the requesting service provider 108 or its service. In one embodiment, these attributes may be configured based on user input.

According to various embodiments, service IE registration module 206 may receive the service IE included from transceiver 202 and register the received service IE in Memory module 212. In this manner, the requesting service provider 108 may register its service IE with controller 102 by sending the service registration request. Upon the registration of the service IE, advertising IE generation module 208 may generate an advertising IE. In one embodiment, the advertising IE may be incorporated in a Beacon frame. For example, the advertising IE may be encoded in a field of the Beacon frame, wherein the field consists of a single bit. Advertising IE generation module 208 may set the field, for example, to "1" when the registration of a new service IE is established. Otherwise, the field remains to be "0". Thus, newly available services may be advertised using the adverting IE consisting of a single bit indicative of the existence of a new active service.

According to various embodiments, service discovery module 210 may perform service discovery process according to a discovery request obtained from MS 106 through transceiver 202. For example, service discovery module 210 may determine whether any one of the service types stored in memory module 212 matches the desired service type based on the discovery request. If one or more matching services are identified, corresponding service IEs are retrieved from memory module 212 and transmitted to the requesting MS 106. Upon the receipt of the service IE, the requesting MS 106 may establish a connection with service provider 108 (e.g., printer) providing the matching service (e.g., printing service) using L3SD such as UPnP.

Figure 3:
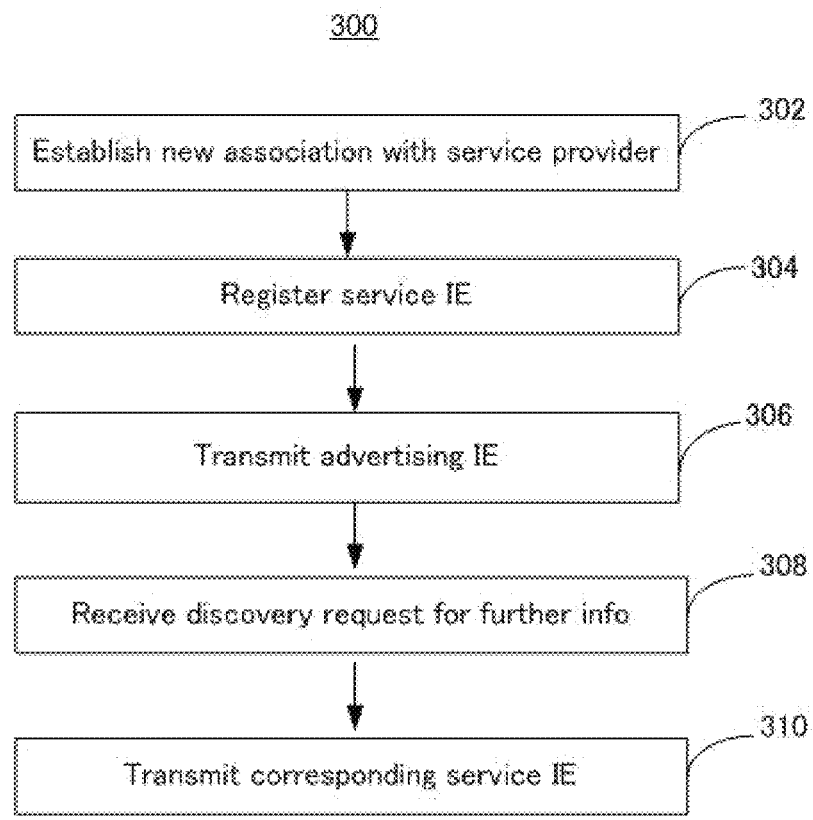
FIG. 3 is a flow diagram illustrating an example process for providing L2SD, according to an embodiment.

FIG. 3 is a flow diagram illustrating an example process 300 for providing L2SD, according to an embodiment. The various processing operations depicted in the flow diagram of FIG. 3 are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

According to various embodiments, a plurality of service IEs associated with respective service providers 108 are registered with controller 102. A new service provider 108, whose service IE has not been registered with controller 102, may be associated with controller 102 in an operation 302. Service provider 108 may use Association Request to request a new association with controller 102. In an operation 304, upon the establishment of the new association, a service IE associated with a particular service provided by the new service provider 108 may be registered in controller 102. In one embodiment, the service IE is transmitted from service provider 108 to controller 102 together with a service registration request and, in turn, arranged to be stored in memory module 212. The service IE may include the service type, context (location), and user friendly name associated with the new service of the requesting service provider 108. Thus, information indicative of the service type, context (location), and user friendly name associated with the new service are stored in memory module 212.

Upon the establishment of the registration of the new service IE, an advertising IE is generated and transmitted to associated MS 106 in an operation 306. In one embodiment, the advertising IE may be incorporated in a Beacon frame by setting a value in a field of the Beacon frame to "1". As such, the single bit field in the Beacon frame may indicate the existence of a new service. The Beacon frame, in turn, may be broadcast or multicast to associated MS 106. Thus, instead of forwarding the registered service IE, the existence of a new service is advertised to associated MS 106 by use of, for example, the single bit field of the Beacon frame. Ms 106 may receive the transmitted advertising IE and, in response, transmit a discovery request for further information of the new service to controller 102 via the wireless medium, if desired. Ms 106 can ignore the advertising IE if it does not need additional service. In one embodiment, MS 106 may determine transmission a discovery request based on a user instruction. Alternatively or additionally, MS 106 may automatically determine whether a discovery request should be transmitted based on a predetermined settings. The discovery request may include a desired service type, for example, printing service or monitor service.

In an operation 308, controller 102 receives the discovery request from MS 106. In an operation 310, the service IE corresponding to the new service is transmitted to the requesting MS 106 in response to the discovery request. Using the transmitted service IE(s), MS 106 may establish upper layer connections with the service providers that can provide the identified services. Thus, because service IEs including various information about provided service are transmitted only to MS 106 that desires to use additional services, an efficient service discovery mechanism can be achieved.

Figure 4:
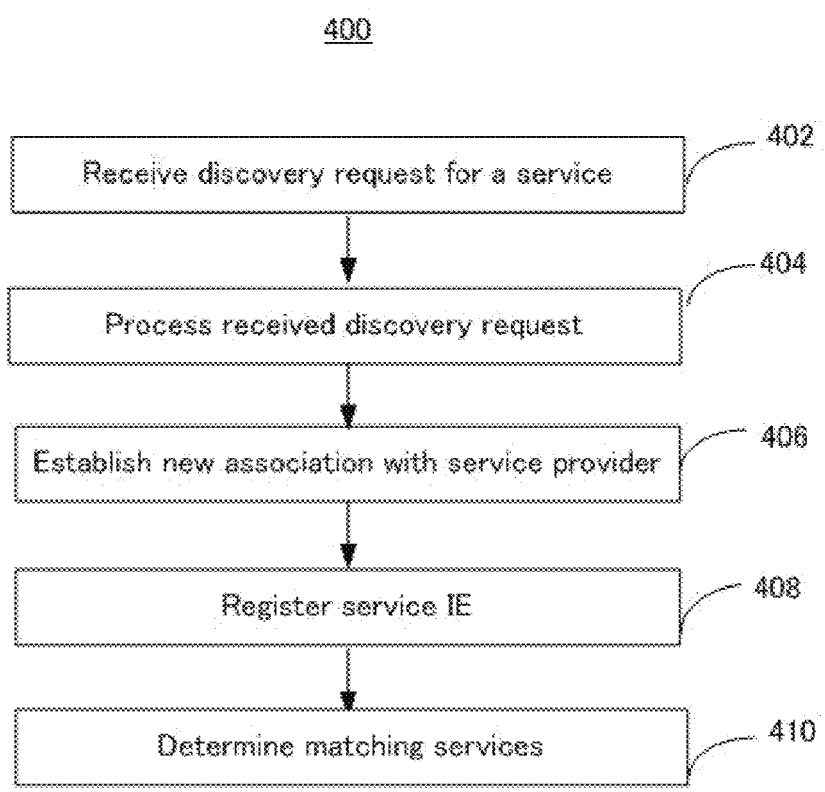
FIG. 4 is a flow diagram illustrating another example process for providing L2SD, according to an embodiment.

FIG. 4 is a flow diagram illustrating another example process 400 for providing L2SD, according to an embodiment. The various processing operations depicted in the flow diagram of FIG. 4 are described in greater detail herein. The described operations for a flow diagram may also be accomplished using some or all of the system components described in detail above. In one embodiment, a plurality of service IEs associated with respective service providers 108 are registered with controller 102. In an operation 402, MS 106 may transmit a discovery request for a desired service to controller 102 before or regardless of receiving any advertising IEs. The discovery request may include one or more device descriptor sub-elements indicative of desired service type or device type.

In an operation 404, upon the receipt of the discovery request at controller 102, it is determined whether any matching service is available. In one embodiment, the desired service type included in the discovery request may be compared with the service types registered in memory module 212. Memory module 212 may include a plurality of service IEs associated with existing service providers 108. If one or more matching services are identified as a result of the comparison, the service IEs corresponding to the identified services are retrieved from memory module 212 and transmitted to the requesting MS 106. On the other hand, if no matching service is found in memory module 212, a response indicating absence of matching service is transmitted as a discovery response message to the requesting MS 106. In parallel with transmitting the discovery response, the desired service type is retained at controller 102.

If a new service provider 108 that has not registered its service IE(s) becomes associated with controller 102 in an operation 406, then a new service IE(s) may be registered with controller 102 at the request of the new service provider 108 in an operation 408. In an operation 410, upon the registration of the new service, a new comparison process may be performed to determine whether the newly registered service IE matches the retained service type. If the new service IE matches the retained desired service type, the service IE is transmitted to MS 106 that previously registered the desired service type. Using the transmitted service IE, MS 106 may establish an upper layer connection with service provider 108 providing the matching service. On the other hand, in case the new service IE does not match the retained desired service type, controller 102 continues to retain the desired service type. This comparison process can be performed repeatedly until a service provider capable of providing the desired type of service is associated with controller 102.

Thus, MS 106 is allowed to register its desired service type with controller 102 and may receive service IEs matching the registered service type once a service provider 108 configured to provide such a matching service is associated with controller 102 without any particular request for the new service provider 108.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. An apparatus comprising:
   a controller for a wireless network system communicatively coupled to one or more associated service providers each of which provides at least one service to one or more associated mobile stations, the controller comprising one or more processors configured to:
   establish a new association between the controller and a new service provider that provides at least one particular service;
   register, upon the establishment of the new association, a service information element associated with the at least one particular service, wherein the service information element includes information indicating a service type of the at least one particular service;
   generate, upon the registration of the service information element, an advertising information element that indicates availability of the at least one particular service provided by the new service provider, wherein the service information element includes larger number of binary bits than that of the advertising information element;
   transmit, from the controller directly to the one or more associated mobile stations, a Layer-2 message including an advertising message including the advertising information element indicating the availability of the at least one particular service; and
   responsive to a transmission of the advertising message indicating the availability of the at least one particular service, receive, from one of the one or more associated mobile stations, a Layer-2 message including a discovery request indicating a desired service type for further information of the at least one particular service,
   wherein, based on a response to the discovery request including the service information element, when the service type of the service information element matches the desired service type, the one of the one or more associated mobile stations is configured to establish at least a connection at a layer higher than Layer-2 with the new service provider.

2. The apparatus of claim 1, wherein the one or more processors are further configured to:

transmits the response to the discovery request including the service information element to a requesting mobile station.

3. The apparatus of claim 2, wherein the service information element is used by the requesting mobile station to determine whether the at least one particular service is desired.

4. The apparatus of claim 2, wherein the service information element is transmitted to the requesting mobile station before a connection between the requesting mobile station and the new service provider is established.

5. The apparatus of claim 3, wherein the service type information included in the service information element is used by the requesting mobile station to determine whether the at least one particular service is desired.

6. The apparatus of claim 1, wherein the one or more processors are further configured to:
   determine whether the service type matches the desired service type; and
   responsive to a determination that the service type matches the desired service type, transmit, to a requesting mobile station, the service information element.

7. The apparatus of claim 1, wherein the Layer-2 message including the advertising message is periodically broadcast.

8. The apparatus of claim 1, wherein the Layer-2 message including the advertising message is configured as a Beacon frame.

9. A computer-implemented method comprising:
   establishing a new association between a controller in a wireless network system and a new service provider, wherein the wireless network system includes the controller and one or more associated service providers each of which provides at least one service to one or more associated mobile stations, the new service provider providing at least one particular service;
   registering, upon the establishment of the new association, a service information element associated with the at least one particular service, wherein the service information element includes information indicating a service type of the at least one particular service;
   generating, upon the registration of the first service information element, an advertising information element that indicates availability of the at least one particular service provided by the new service provider, wherein the service information element includes larger number of binary bits than that of the advertising information element;
   transmitting, from the controller directly to the one or more associated mobile stations, a Layer-2 message including an advertising message including the advertising information element indicating the availability of the at least one particular service; and
   responsive to said transmitting of the advertising message indicating the availability of the at least one particular service, receiving, from a requesting mobile station of the one or more associated mobile stations, a Layer-2 message including a discovery request indicating a desired service type for further information of the at least one particular service,
   wherein, based on a response to the discovery request including the service information element, when the service type of the service information element matches the desired service type, the one of the one or more associated mobile stations is configured to establish at least a connection at a layer higher than Layer-2 with the new service provider.

10. The computer-implemented method of claim 9, further comprising:
    transmitting the response to the discovery request including the service information element to the requesting mobile station.

11. The computer-implemented method of claim 10, wherein the service information element is used by the requesting mobile station to determine whether the at least one particular service is desired.

12. The computer-implemented method of claim 10, wherein the service information element is transmitted to the requesting mobile station before a connection between the requesting mobile station and the new service provider is established.

13. An apparatus comprising:
    a controller for a wireless network system communicatively coupled to one or more associated service providers each of which provides at least one service to one or more associated mobile stations, the controller comprising one or more processors configured to:
    receive, from one of the one or more associated mobile stations, a Layer-2 Service Discovery (L2SD) message having a discovery request for a service including a device descriptor element indicating a desired service type or a device type, wherein the discovery request is received without an advertising message related to the desired service type being transmitted from the controller to the one or more associated mobile stations, wherein the desired service type indicates a functionality of the service;
    retain the desired service type at a memory device;
    establish a new association between the controller and a new service provider that provides at least one particular service;
    register, upon the establishment of the new association, a service information element associated with the at least one particular service;
    determine, upon the registration of the service information element, whether the at least one particular service matches the retained desired service type in the discovery request; and
    transmit the service information element to the requesting mobile station if the at least one particular service matches the retained desired service type in the discovery request, wherein, using the service information element, the requesting mobile station is configured to establish a connection with the new service provider, wherein the connection includes an upper layer connection at a layer higher than Layer-2.

14. The apparatus of claim 13, wherein the one or more processors are further configured to:
    determine, upon the receipt of the discovery request, whether said at least one service provided by said one or more associated service providers matches the discovery request;
    transmit, to the requesting mobile station, one or more service information elements corresponding to the matching services; and
    retain the received discovery request at a memory device only if none of said at least one service matches the discovery request.

15. The apparatus of claim 13, wherein the one or more processors are further configured to:
    update the retained discovery request in response to a update request from the requesting mobile station.

16. The apparatus of claim 13, wherein the one or more processors are further configured to remove the retained discovery request if the at least one particular service matches the retained discovery request.

17. The apparatus of claim 13, wherein the one or more processors are further configured to determine whether the at least one particular service matches the retained desired service type in the discovery request by comparing the functionality of the requested service with the service information element corresponding to the at least one particular service.

18. An apparatus comprising:
- a controller for a wireless network system communicatively coupled to one or more associated service providers each of which provides at least one service to one or more associated mobile stations, the controller comprising one or more processors configured to:
- register a service information element associated with at least one particular service provided by a service provider, wherein the service information element includes information indicating a service type of the at least one particular service;
- generate, upon the registration of the service information element, an advertising information element that consists of a bit indicative of the existence of the at least one particular service provided by the service provider;
- transmit, from the controller directly to the one or more associated mobile stations, a Layer-2 message including an advertising message including the advertising information element;
- responsive to the advertising message indicative of the existence of the at least one particular service, receive a Layer-2 message including a discovery request indicating a desired service type for the at least one particular service, the discovery request being transmitted from one of the one or more associated mobile stations; and
- transmit, in response to the discovery request and when the service type of the service information element matches the desired service type, to the requesting mobile station, the service information element, wherein, using the at least part of the service information element, the requesting mobile station is configured to establish at least a connection at a layer higher than Layer-2 with the service provider.

19. The apparatus of claim 18, wherein the advertising information element consists of a single binary bit.

* * * * *